(12) United States Patent
Kourtakis et al.

(10) Patent No.: US 11,254,094 B2
(45) Date of Patent: *Feb. 22, 2022

(54) MULTILAYER POLYMER FILM

(71) Applicant: DUPONT ELECTRONICS, INC., Wilmington, DE (US)

(72) Inventors: Kostantinos Kourtakis, Media, PA (US); Gene M Rossi, Wilmington, DE (US); Leopoldo Alejandro Carbajal, Newark, DE (US); Mark Allan Lamontia, Landenberg, PA (US); Mobin Yahyazadehfar, Garnet Valley, PA (US); Ross S Johnson, Wilmington, DE (US); Weiying Gao, Landenberg, PA (US); Aref Samadidooki, Wilmington, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,668

(22) Filed: Oct. 26, 2020

(65) Prior Publication Data

US 2021/0053314 A1  Feb. 25, 2021

Related U.S. Application Data

(63) Continuation-in-part of application No. 16/681,119, filed on Nov. 12, 2019.

(60) Provisional application No. 62/760,523, filed on Nov. 13, 2018, provisional application No. 62/760,506, filed on Nov. 13, 2018, provisional application No. 62/760,499, filed on Nov. 13, 2018, provisional application No. 62/760,488, filed on Nov. 13, 2018, provisional application No. 62/760,478, filed on Nov. 13, 2018.

(51) Int. Cl.
| | |
|---|---|
| B32B 7/022 | (2019.01) |
| B32B 27/08 | (2006.01) |
| B32B 27/28 | (2006.01) |
| B32B 27/34 | (2006.01) |
| B32B 27/18 | (2006.01) |

(52) U.S. Cl.
CPC ............ *B32B 7/022* (2019.01); *B32B 27/08* (2013.01); *B32B 27/18* (2013.01); *B32B 27/281* (2013.01); *B32B 27/34* (2013.01); *B32B 2250/24* (2013.01); *B32B 2255/10* (2013.01); *B32B 2255/26* (2013.01); *B32B 2264/1021* (2020.08); *B32B 2264/301* (2020.08); *B32B 2307/10* (2013.01); *B32B 2307/412* (2013.01); *B32B 2457/206* (2013.01)

(58) Field of Classification Search
CPC ....... B32B 7/022; B32B 27/08; B32B 27/281; B32B 27/34; B32B 27/18; B32B 2307/412; B32B 2250/24; B32B 2264/301; B32B 2307/10; B32B 2255/26; B32B 2255/10; B32B 2457/206; B32B 2264/1021

See application file for complete search history.

(56) References Cited

U.S. PATENT DOCUMENTS

| | | | |
|---|---|---|---|
| 2,801,185 A | 7/1957 | Iler | |
| 4,522,958 A | 6/1985 | Das et al. | |
| 5,648,407 A | 7/1997 | Goetz et al. | |
| 2008/0138537 A1* | 6/2008 | Simone | C08L 79/08 428/1.1 |
| 2015/0118462 A1 | 4/2015 | Hwang et al. | |
| 2015/0147532 A1 | 5/2015 | Nam et al. | |
| 2015/0183932 A1 | 7/2015 | Katayama et al. | |
| 2016/0048171 A1 | 2/2016 | Lee et al. | |
| 2016/0101593 A1* | 4/2016 | Nam | B32B 3/04 428/213 |
| 2016/0137789 A1* | 5/2016 | Suenaga | B32B 27/08 428/220 |
| 2018/0088392 A1 | 3/2018 | Park et al. | |

FOREIGN PATENT DOCUMENTS

| | | | | |
|---|---|---|---|---|
| JP | 2014-019108 A | | 2/2014 | |
| WO | WO-2018186262 A1 * | 10/2018 | | B32B 27/34 |
| WO | 2020/102280 A1 | | 5/2020 | |

OTHER PUBLICATIONS

English machine translation of WO2018/186262, Oct. 11, 2018 (Year: 2018).*
PCT International Search Report for Application No. PCT/US2019/061076; Sze Man Yu (Authorized Officer) ISA/EPO; dated Feb. 12, 2020.
PCT International Search Report for Application No. PCT/US2019/061086; Sze Man Yu (Authorized Officer) ISA/EPO; dated Feb. 13, 2020.

* cited by examiner

*Primary Examiner* — Michael C Miggins

(57) ABSTRACT

In a first aspect, a multilayer polymer film includes a first polymer layer having a first elastic modulus and a second polymer layer having a second elastic modulus. The first polymer layer includes a polyimide, a polyamide imide, a block copolymer of a polyimide or a polyamide imide or a mixture thereof. The second polymer layer includes a polyimide, a polyamide imide, a block copolymer of a polyimide or a polyamide imide or a mixture thereof. The first elastic modulus is different from the second elastic modulus. The first and second polymer layers are bonded by consolidation. In a second aspect, a cover window for a display includes a hard coat layer and the multilayer polymer film of the first aspect. The first polymer layer of the multilayer polymer film is the layer farthest from the display and is adhered to the hard coat layer.

12 Claims, No Drawings

MULTILAYER POLYMER FILM

FIELD OF THE DISCLOSURE

This invention is directed to multilayer polymer films and cover windows for displays.

BACKGROUND OF THE DISCLOSURE

There is increasing interest in creating foldable OLED displays to be used in foldable smart phones, small tablets, rollable phones and rollable large display formats for singly and doubly curved displays for such uses as automotive panels and appliance panels.

Polyimide films that contain aromatic monomers are typically very thermally stable and are foldable. In addition to optical requirements, flexibility requirements, surface damage resistance and folding endurance requirements, a cover window must provide severe impact endurance. Like rigid glass that can shatter or withstand an impact wave, a polymer will transmit impact energy via sound waves emanating from the impact directly onto the display. If the impact energy is low, the display will remain intact. As the impact energy increases, the display could suffer damage, at worst, damaging the underlying electronic components and rendering the display useless.

A film construction that can protect the display electronic components from a sharp impact and does not suffer from delamination will be important for flexible displays for portable electronics.

SUMMARY

In a first aspect, a multilayer polymer film includes a first polymer layer having a first elastic modulus and a second polymer layer having a second elastic modulus. The first polymer layer includes a polyimide, a polyamide imide, a block copolymer of a polyimide or a polyamide imide or a mixture thereof. The second polymer layer includes a polyimide, a polyamide imide, a block copolymer of a polyimide or a polyamide imide or a mixture thereof. The first elastic modulus is different from the second elastic modulus. The first and second polymer layers are bonded by consolidation.

In a second aspect, a cover window for a display includes a hard coat layer and the multilayer polymer film of the first aspect. The first polymer layer of the multilayer polymer film is the layer farthest from the display and is adhered to the hard coat layer.

DETAILED DESCRIPTION

In a first aspect, a multilayer polymer film includes a first polymer layer having a first elastic modulus and a second polymer layer having a second elastic modulus. The first polymer layer includes a polyimide, a polyamide imide, a block copolymer of a polyimide or a polyamide imide or a mixture thereof. The second polymer layer includes a polyimide, a polyamide imide, a block copolymer of a polyimide or a polyamide imide or a mixture thereof. The first elastic modulus is different from the second elastic modulus. The first and second polymer layers are bonded by consolidation.

In one embodiment of the first aspect, the first polymer layer, the second layer, or both the first and second polymer layers further include nanoparticles.

In another embodiment of the first aspect, the polymer of the first polymer layer is cross-linked, the polymer of the second polymer layer is cross-linked, or the polymers of both the first and second polymer layers are cross-linked.

In still another embodiment of the first aspect, the first polymer layer further includes an imidization catalyst, or the second polymer layer further includes an imidization catalyst, or both the first and second polymer layers further include an imidization catalyst.

In yet another embodiment of the first aspect, the multilayer polymer film further includes a third polymer layer having a third elastic modulus. The third polymer layer includes a polyimide, a polyamide imide, a block copolymer of a polyimide or a polyamide imide or a mixture thereof. The second polymer layer is positioned between the first and third polymer layers and the second and third polymer layers are bonded by consolidation. In a specific embodiment, the second elastic modulus is smaller than the first elastic modulus and the third elastic modulus is greater than the second elastic modulus, or the second elastic modulus is greater than the first elastic modulus and the third elastic modulus is greater than the second elastic modulus, or the second elastic modulus is smaller than the first elastic modulus and third elastic modulus smaller than the second elastic modulus, or the second elastic modulus is smaller than the first elastic modulus and third elastic modulus greater than the second elastic modulus. In another specific embodiment, the first elastic modulus and the third elastic modulus are essentially the same, or the first elastic modulus is greater than the third elastic modulus, or the third elastic modulus is greater than the first elastic modulus.

In a second aspect, a cover window for a display includes a hard coat layer and the multilayer polymer film of the first aspect. The first polymer layer of the multilayer polymer film is the layer farthest from the display and is adhered to the hard coat layer.

In one embodiment if the second aspect, the multilayer polymer film has interfaces between the layers and each of the interfaces has a Mode I interlaminar fracture toughness ($G_{Ic}$) of at least 100 J/m².

In another embodiment of the second aspect, the cover window further includes a layer of transparent material with a high speed of sound positioned between the multilayer polymer film and the display. In a specific embodiment, the transparent material with a high speed of sound has a speed of sound of at least 2000 m/s. In another specific embodiment, the transparent material with a high speed of sound is selected from the group consisting of glass, polyimide, polyamide imide, poly(methyl methacrylate), polyether ketone, polystyrene, polycarbonate, polyester and particle reinforced polymer.

In still another embodiment of the second aspect, the cover window further includes a layer of transparent material with a high speed of sound positioned between the first polymer layer of the multilayer polymer film and the hard coat layer. In a specific embodiment, the transparent material with a high speed of sound has a speed of sound of at least 2000 m/s. In another specific embodiment, the transparent material with a high speed of sound is selected from the group consisting of glass, polyimide, polyamide imide, poly(methyl methacrylate), polyether ketone, polystyrene, polycarbonate, polyester and particle reinforced polymer.

In yet another embodiment of the second aspect, the cover window of further includes a first layer of transparent material with a high speed of sound positioned between the multilayer polymer film and the display and a second layer of transparent material with a high speed of sound positioned on the first layer of the multilayer polymer film on a side opposite the display. In a specific embodiment, the first transparent material with a high speed of sound has a speed of sound of at least 2000 m/s, or the second transparent material with a high speed of sound has a speed of sound of at least 2000 m/s, or both the first and second transparent materials with a high speed of sound has a speed of sound of at least 2000 m/s.

In still yet another embodiment of the second aspect, during bending, at least one of the polymer layers of the multilayer polymer film does not experience any longitudinal tensile strain.

Polyimides that contain aromatic monomers are typically very thermally stable and are foldable.

Compositions of block copolymers of polyimides and polyamide imides typically are stiffer, i.e., have a higher elastic modulus, than polyimide compositions. For example, the block copolymer can have a longer or higher molecular weight block containing a combination of a more rigid dianhydride and/or a more rigid diamine. In this way, the mechanical properties of the block copolymer can be manipulated relative to the other layers in the multilayer film. In one embodiment, a block copolymer of polyimides or polyamide imides will be used for a layer requiring a higher elastic modulus and a polyimide will be used for a layer with a lower elastic modulus.

Polyamide imide compositions typically are stiffer, i.e., have a higher elastic modulus, than polyimide compositions. In one embodiment, a polyamide imide will be used for a layer requiring a higher elastic modulus and a polyimide will be used for a layer with a lower elastic modulus.

In one embodiment, the elastic modulus of a polymer layer can be increased by the presence of inorganic or organic nanoparticles. In another embodiment, the elastic modulus of a polymer layer can be increased by cross-linking between the polymer chains in the polymer layer. In still another embodiment, the elastic modulus of a polyimide layer can be increased by the introduction of an imidization catalyst into the layer.

There are various embodiments of a multilayer polymer film with different numbers of layers and variations on the relative elastic moduli of the layers In one embodiment, there are three polymer layers, the first layer having a first elastic modulus, the second layer having a second elastic modulus, and the third layer having a third elastic modulus, wherein the second layer is positioned between the first layer and the third layer.

In one three-polymer layer embodiment, the second elastic modulus is smaller than the first elastic modulus and the third elastic modulus is greater than the second elastic modulus. In one such embodiment, the first elastic modulus has been increased by the presence of inorganic or organic nanoparticles in the first polymer layer, by cross-linking between the polymer chains in the first polymer layer, by the introduction of an imidization catalyst into the first polymer layer, or by a combination thereof. Alternatively, in other embodiments, the first polymer layer is a polyamide imide layer or a layer of block copolymer of polyimides or polyamide imides, and the second polymer layer is a polyimide. In another such embodiment, the elastic modulus of the third polyimide layer has been increased by the presence of inorganic or organic nanoparticles in the third polymer layer, by cross-linking between the polymer chains in the third polymer layer, by the introduction of an imidization catalyst into the third polymer layer, or by a combination thereof. Alternatively, in other embodiments, the third polymer layer is a polyamide imide layer or a layer of block copolymer of polyimides or polyamide imides. In still another such embodiment, the first elastic modulus and the third elastic modulus are essentially the same. In still another such embodiment, the first elastic modulus is greater than the third elastic modulus.

In another three-polymer layer embodiment, the second elastic modulus is smaller than the first elastic modulus and the third elastic modulus is smaller than the second elastic modulus. In one such embodiment, the first elastic modulus has been increased by the presence of inorganic or organic nanoparticles in the first polymer layer, by cross-linking between the polymer chains in the first polymer layer, by the introduction of an imidization catalyst into the first polymer layer, or by a combination thereof. Alternatively, in other embodiments, the first polymer layer can be a polyamide imide layer or a layer of block copolymer of polyimides or polyamide imides.

In still another three-polymer layer embodiment, the second elastic modulus is greater than the first elastic modulus and the third elastic modulus is greater than the second elastic modulus. In one such embodiment, the third elastic modulus has been increased by the presence of inorganic or organic nanoparticles in the third polymer layer, by cross-linking between the polymer chains in the third polymer layer, by the introduction of an imidization catalyst into the third polymer layer, when it includes a polyimide, or by a combination thereof. Alternatively, in other embodiments, the third polyimide layer can be a polyamide imide layer or a layer of block copolymer of polyimides or polyamide imides.

In another embodiment, there are four polymer layers, the first layer having a first elastic modulus, the second layer having a second elastic modulus, the third layer having a third elastic modulus, and the fourth layer a fourth elastic modulus, wherein the second layer is positioned between the first layer and the third layer and the third layer is positioned between the second layer and the fourth layer.

In one four-polymer layer embodiment, the second elastic modulus is smaller than the first elastic modulus, the third elastic modulus is smaller than the second elastic modulus, and the fourth elastic modulus is larger than the third elastic modulus. In one such embodiment, the first elastic modulus has been increased as described above for the three-polymer layer embodiments. In another such embodiment, the second elastic modulus has been increased as described above for the three-polymer layer embodiments. In yet another such embodiment, the fourth elastic modulus has been increased as described above for the three-polymer layer embodiments. In still another such embodiment, the second elastic modulus and the fourth elastic modulus are essentially the same. In an additional embodiment, the second elastic modulus is larger than the fourth elastic modulus.

In another four-polymer layer embodiment, the second elastic modulus is smaller than the first elastic modulus, the third elastic modulus is smaller than the second elastic modulus, and the fourth elastic modulus is smaller than the third elastic modulus.

In still another four-polymer layer embodiment, the second elastic modulus is smaller than the first elastic modulus, the third elastic modulus is greater than the second elastic modulus, and the fourth layer has a low glass transition temperature and the fourth elastic modulus is smaller than the elastic modulus of any of the other three layers. In still another such embodiment, the first elastic modulus and the third elastic modulus are essentially the same. In an additional such embodiment, the first elastic modulus is larger than the third elastic modulus.

In still another embodiment, there are five polymer layers, the first layer having a first elastic modulus, the second layer having a second elastic modulus, the third layer having a third elastic modulus, the fourth layer a fourth elastic modulus, and the fifth layer having a fifth elastic modulus, wherein the second layer is positioned between the first layer and the third layer, the third layer is positioned between the second layer and the fourth layer and the fourth layer is positioned between the third layer and the fifth layer.

In one five-polymer layer embodiment, the second elastic modulus is smaller than the first elastic modulus, the third elastic modulus is smaller than the second elastic modulus, the fourth elastic modulus is greater than the third elastic modulus, and the fifth layer has a low glass transition temperature and a fifth elastic modulus smaller than the elastic modulus of any of the other four layers and wherein the first elastic modulus is greater than the elastic modulus of any of the other four layers. In one such embodiment, the elastic modulus of the first polymer layer has been increased as described above for the three-polymer layer embodiments. In another such embodiment, the second elastic modulus and the fourth elastic modulus are essentially the same. In still another such embodiment, the second elastic modulus is greater than the fourth elastic modulus.

In another five-polymer layer embodiment, the second elastic modulus is smaller than the first elastic modulus, the third elastic modulus is smaller than the second elastic modulus, the fourth elastic modulus is smaller than the third elastic modulus, and the fifth layer has a low glass transition temperature and a fifth elastic modulus smaller than the elastic modulus of any of the other four layers and wherein the first elastic modulus is greater than the elastic modulus of any of the other four layers. In one such embodiment, the elastic modulus of the first polymer layer has been increased as described above for the three-polymer layer embodiments.

In still another five-polymer layer embodiment, the second elastic modulus is smaller than the first elastic modulus, the third elastic modulus is greater than the second elastic modulus, the fourth elastic modulus is greater than the elastic modulus of any of the other four layers, and the fifth layer has a low glass transition temperature and a fifth elastic modulus smaller than the elastic modulus of any of the other four layers. In another such embodiment, the first elastic modulus and the third elastic modulus are essentially the same. In still another such embodiment, the first elastic modulus is greater than the third elastic modulus.

In another five-polymer layer embodiment, the second elastic modulus is smaller than the first elastic modulus, the third elastic modulus is smaller than the second elastic modulus, the fourth elastic modulus is greater than the elastic modulus of any of the other four layers, and the fifth layer has a low glass transition temperature and a fifth elastic modulus smaller than the elastic modulus of any of the other four layers. Those skilled in the art will understand how to form multilayer polymer films bonded by consolidation having any number of layers and also how to control the relative elastic moduli of each layer.

In one embodiment, a difference between the elastic moduli of two adjacent polymer layers is at least 5, at least 15 or at least 25%.

Even when using the same polyimide and the same amount of inorganic or organic nanoparticles, the same degree of cross-linking, the same amount of imidization catalyst, the same block copolymer of polyimides or polyamide imides, or the same polyamide imide, it is difficult to produce two layers with exactly identical elastic moduli. "Essentially identical" is used herein to describe those layers prepared with the intent and care to have the same elastic moduli.

Various other layers in the configurations described above may also have the elastic modulus increased by the presence of inorganic or organic nanoparticles, by cross-linking between polymer chains, by the introduction of an imidization catalyst, or by a combination thereof.

In one embodiment, the polymer films must be colorless and transparent. Transparency or high transmittance in the visible spectrum (400-700 nm), or between 380 and 780 nm, is necessary. Typical specifications require that both a* and b* are no greater than 1 color unit from neutral (0) in CIE L*, a*, b* color space coordinates. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow). For a 50 μm film, the absolute value of a* and b* should each be less than 2, or less than 1.

The polyimides, polyamide imides and block copolymers of polyimides or polyamide imides are described in terms of the diamines and dianhydrides used to form them.

Examples of suitable diamines to form the polyimide, polyamide imide and block copolymer of polyimide or polyamide imide layers include p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene, 2,4,6-trimethyl-1,3-diaminobenzene. Useful non-aromatic diamines can include both linear and cyclic diamines, including 1,2-diaminoethane (1,2-DAE); 1,5-diaminopentane (1,5-DAP); 1,6-diaminohexane (1,6-HMDA); 1,7-diaminoheptane; 1,8-diaminooctane; 1,9-diaminononane; 1,11-diaminoundecane; 1,12-diaminododecane; N-(3-aminopropyl)-1,4butanediamine, N,N'-bis(3-aminopropyl)-1,4-butanediamine; N-(3-aminopropyl)-1,3-propanediamine; and N1-(3-(3-aminopropylamino) propyl)butane-1,4-diamine.

In one embodiment, a suitable diamine can include a fluorinated diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5-ditrifluoro-methyl)phenyl]benzene (6FC-diamine), 3,5-diamino-4-methyl-2',3',5',6'-tetrafluoro-4'-tri-fluoromethyldiphenyloxide, 2,2-Bis[4'(4"-aminophenoxy)phenyl] phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB).

In one embodiment, any number of suitable dianhydrides can be used. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride and cyclobutane-1,2,3,4-tetracarboxylic dianhydride (CBDA).

In one embodiment, a suitable dianhydride can include a fluorinated dianhydride, such as 4,4'-(hexafluoroisopropylidene)diphthalic anhydride (6FDA) and 9,9-bis (trifuoromethyl)-2,3,6,7-xanthene tetracarboxylic dianhydride. In a specific embodiment, the fluorinated dianhydride is 4,4'-(hexafluoroisopropylidene)diphthalic anhydride (6FDA).

In specific embodiments, 6FDA/TFMB, BPDA/6FDA//TFMB and CBDA/6FDA//TFMB polymer layers can be used to form multilayers. In one embodiment, a poly(amic acid) blend containing BPDA, 6FDA and TFMB was created by polymerizing BPDA with TFMB and combining with a polyamic acid derived from the reaction of 6FDA with TFMB. In one embodiment, a poly(amic acid) blend containing CBDA, 6FDA and TFMB can be created by polymerizing CBDA with TFMB and combining with a polyamic acid derived from the reaction of 6FDA with TFMB.

In one embodiment, the elastic modulus of a polymer layer can be increased by the presence of nanoparticles. The nanoparticles can be inorganic oxides and mixed oxides such as oxides of silicon, aluminum and titanium, hollow (porous) silicon oxide, antimony oxide, zirconium oxide, indium tin oxide, antimony tin oxide, mixed titanium/tin/zirconium oxides and mixtures thereof. The oxides can be oxynitrides, and chalcogenides. The nanoparticles can be organic particles, such as polymeric particles (e.g., polyimide particles). For use in a cover window, the nanoparticles must possess a long diameter no greater than ~100 nm to minimize haze and prevent excessive light scatter in the visible region (~400-700 nm). In one example of this invention, silicon oxide nanoparticles (~20-30 nm in diameter) are included in a polyimide layer. The outer layer modulus can be increased while maintaining a softer core layer. Since there is some interdiffusion between layers, the boundary layers where there is intermixing between layers can extend over a distance of 1-2 µm or greater so that the transition in properties between adjacent layers are more gradual.

In one embodiment, the elastic modulus of a polymer layer can be increased by cross-linking between the polymer chains within the layer. The cross-linking chemistry is targeted within specific layers in which a higher elastic modulus and speed of sound is required. Cross-linking between the polymer chains can be achieved through thermal processing or through UV initiated chemistries.

Thermally induced cross-linking between the polymer chains can be achieved by introducing diacetylene groups into the polymer composition. These acetylene or ethylene groups can be cross-linked with other acetylene or ethylene groups, in some cases by thermally activated processes near the temperature of imidization of the film. Other approaches for thermally initiated cross-linking include the inclusion of monomers with carboxylic acid pendant groups that can decarboxylate at moderate temperatures to generate radicals that can react and form covalent bonds with entities on a neighboring polymer chain. An example of such a monomer which can be co-polymerized into the polyamic acid is 3,5 diaminobenzoic acid, which would generate an aryl radical to initiate cross-linking reactions.

Cross-linking chemistry between polymer chains can also be achieved through the incorporation of diols into the polymer backbone. One such example is 1,4-butylene glycol. In addition, the diols can react with carboxylic acid moieties on neighboring chains (such as those introduced by diaminobenzoic acid) to form an ester linkage between polymer chains.

UV induced cross-linking reactions can also be used, and these may be performed before or after the thermal imidization step. One approach would be to incorporate DAM (2,4,6-trimethyl-1,3-phenylene diamine) into the polymer backbone during the formation of the polyamic acid along with a benzophenone monomer such as BTDA (3',4,4'-benzophenonoetetracarboxylic dianhdride). It is postulated that the benzophenone can react with hydrogen donating moieties on a neighboring chain (such as those on the DAM monomer or another monomer with pendant hydrogen groups) through hydrogen abstraction and subsequent radical coupling between the polymer chains.

Cross-linking and branching between polymer chains can also be achieved by introducing trifunctional monomers (e.g. triamines) into the polymer backbone.

The cross-linking chemistry has a beneficial impact on the interlayer bonding. For instance, if two chemical moieties are needed for the cross-link, one could be used for the polymer composition in each layer. A thermally or UV induced cross-linking reaction can improve the bonding between layers by introducing covalent bonds between polymer chains of two neighboring layers.

In one embodiment, polyimide layer properties can be adjusted by the introduction of imidization catalysts into specific layers. In general, the catalyst will lower the temperature of imidization, increase the crystallinity and increase the polyimide modulus. The concentration and type of catalyst can be used to control properties. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Some configurations may have different catalysts introduced into different layers, depending on the properties desired. For instance, for a three-layer polyimide film where the first and third layers possess an increased modulus, the catalysts can be introduced only into those two layers.

Since there is some interdiffusion of solvents between layers, the imidization catalyst can also interdiffuse to some degree as well. This will depend on the catalyst concentration, the thickness of the layers, and the drying profile used to prepare the film. In this way, a property gradation from one layer to another can be achieved.

Adjacent polymer layers of the multilayer polymer film are bonded by consolidation. Consolidation is a welding process rather than an adhesion process. The layers to be consolidated or welded must be capable of undergoing a physical change—melting and solidification. There is heat transfer to soften and melt the layers to be consolidated together. The surfaces are brought together and allowed to accomplish intimate molecular contact. There is polymer interdiffusion by reptation (snake-like) motion. This accomplishes strong bonds as the long polymer chains move across the interface of the two layers to be consolidated. It is common for the reconsolidated interface to be undetectable.

In this process, the polyamic or polyimide amic acids are either cast as polyamic acid layers, partially imidized polyamic layers, polyamide amic acids, soluble polyimides or soluble polyamide imides. These layers can be cast in a co-extrusion process that results in consolidation. In this process, the polyamic acid polymer chains can co-mingle; there can be co-entanglement of the polyamic or polyimide amic acids layers, partially imidized polyamic layers, polyimide amic acids, soluble polyimide or soluble polyamide imides chains between neighboring layers as discussed above. There will be greater interlayer bonding than can be conventionally achieved by coating one formulation onto a second pre-formed polymer substrate. When the multi-layer is based on polyamic acid, it can be imidized in a separate step, so that the entire multilayer is cured or imidized simultaneously. If the material is co-extruded using a multicavity die with independent polyamic acid streams, there is also a significant manufacturing cost advantage, because the layers are formed and combined in a single or cascaded casting process (as opposed to sequentially coating one film layer on top of the other). In one embodiment, multiple slot dies can be slightly cascaded.

In one embodiment, the multilayer polymer film is prepared by simultaneously extruding the layers. In some embodiments, the layers are extruded through a single or multi-cavity extrusion die. In one embodiment, the multilayer film is produced using a single-cavity die. If a single-cavity die is used, the laminar flow of the streams should be of high enough viscosity to prevent comingling of the streams and to provide even layering. In one embodiments, the multilayer polymer film is prepared by casting from a slot die onto a moving stainless-steel belt. In a specific embodiment including a polyimide layer(s), the belt is then passed through a convective oven, to evaporate solvent and partially imidize the polymer, to produce a "green" film. The green film can be stripped off the casting belt and wound up. The green film can then be passed through a tenter oven to fully cure the polyimide. In some embodiments, during tentering, shrinkage can be minimized by constraining the film along the edges (i.e. using clips or pins).

In some embodiments, layers can be formed by successive coatings of the polyamic acid, polyamic imide, soluble polyimide, or soluble polyamide imides. For instance, solutions of these polymers can be sequentially deposited by slot die coating, casting, or similar processes.

In one embodiment, outer layers of a multilayer polymer film can be applied to a core layer or during an intermediate manufacturing stage of film formation, such as to gel film or to green film.

Also provided is a cover window for a display comprising a multilayer polymer film of the invention. The first layer of each of the various multilayer variations is the layer farthest from the display.

In an impact resistance structure such as the cover window, the velocity at which stresses propagate in a material must be high to allow dissipation of the initial kinetic energy over a large volume of the structure, and to enhance the interchange of momentum between an impactor and the target. Sound, a mechanical wave, and stresses propagate at various wave speeds in a material. Different modes of deformation result in different waves speeds (longitudinal, distortional, rayleigh, etc.) in a material.

Herein reference to the high speed of sound layer means the speed of the longitudinal wave in the material. This is the fastest elastic wave in a material. It is common to refer to the speed of the longitudinal wave as the speed of sound in the material. For an isotropic material, the longitudinal wave speed equation is $$C_L = \sqrt{\frac{(1-v)}{(1+v)(1-2v)} \frac{E}{\rho}}$$

where,
E is the elastic modulus of the material
v is the Poisson's ratio of the material
$\rho$ is the density of the material In an embodiment, the interfaces in the multilayer polymer film have a Mode I interlaminar fracture toughness ($G_{Ic}$) of at least 100, at least 500, at least 1500 or at least 3000 J/m².

In one embodiment, the cover window further comprises a layer of transparent material with a high speed of sound positioned between the multilayer polymer film and the display. In one such embodiment, the speed of sound of the transparent material with a high speed of sound is at least 2000, at least 2500 or at least 3000 m/s. In another such embodiment, the transparent material with a high speed of sound is glass, polyimide, polyamide imide, poly(methyl methacrylate), polyether ketone, polystyrene, polycarbonate or polyester. In still another such embodiment, the transparent material with a high speed of sound is a particle reinforced polymer.

In another embodiment, the cover window further comprises a layer of transparent material with a high speed of sound positioned above the first layer of the multilayer polymer film. In one such embodiment, the speed of sound of the transparent material with a high speed of sound is at least 2000, at least 2500 or at least 3000 m/s. In another such embodiment, the transparent material with a high speed of sound is glass, polyimide, polyamide imide, poly(methyl methacrylate), polyether ketone, polystyrene, polycarbonate or polyester. In still another such embodiment, the transparent material with a high speed of sound is a particle reinforced polymer.

In another embodiment, the cover window further comprises two layers of transparent material with a high speed of sound, one layer positioned between the multilayer polymer film and the display and one layer positioned above the first layer of the multilayer polymer film. In one such embodiment, the speed of sound of the transparent material with a high speed of sound is at least 2000, at least 2500 or at least 3000 m/s. In another such embodiment, the transparent material with a high speed of sound is glass, polyimide, polyamide imide, poly(methyl methacrylate), polyether ketone, polystyrene, polycarbonate or polyester. In still another such embodiment, the transparent material with a high speed of sound is a particle reinforced polymer.

In one embodiment, a hard coat layer can be made from an organic material, an inorganic material, an organic/inorganic hybrid material, or a combination thereof. Examples of the organic material can include, but are not limited to, epoxy-siloxane resin, silicone, poly(meth)acrylate, polyurethane-(meth)acrylate, polyurethane, epoxy, and combinations thereof. The inorganic materials can include, but are not limited to, silica, alumina, or zirconia. The organic/inorganic hybrid material can be polysilsesqiuoxane.

In one embodiment, the hard coat layer can be produced from a hard coating composition containing an epoxy-siloxane oligomer, organic particles having an average diameter of 50 to 250 nm and a reactive carrier having one or more epoxy or oxetane moieties. The compositions and the resulting hard coat layers are disclosed in U.S. Patent Application No. 2019/0185710, the entire contents of which are incorporated herein by reference.

In another embodiment, the hard coat layer can be produced from a hard coating composition comprising siloxane oligomer or siloxane oligomer with nano particles of silica or a metal oxide. The compositions and hard coat layers are disclosed in U.S. Patent Application Nos. 2017/0369654 and 2019/0185633, the entire contents of which are incorporated herein by reference.

In yet another embodiment, the hard coat layer can comprise polyurethane-(meth)acrylate made from an ultraviolet curable acrylic composition. The composition can comprise aliphatic tri-, tetra-, or penta-functional (meth)acrylate monomer, an acrylate monomer containing isocyanurate group, a urethane (meth)acrylate oligomer and a UV radical initiator. The compositions and hard coat layers are disclosed in U.S. Patent Application No. 2019/0185602, the entire contents of which are incorporated herein by reference.

In some embodiments, one hard coat layer can comprise at least two hard coat layers. The hard coat layer can have a thickness of from 0.1 to 200 μm, or from 0.5 to 150 μm, or from 1 to 100 μm, or from 1 to 50 μm, or from 1 to 30 μm, or from 1 to 20 μm, or from 1 to 10 μm, or from 1 to 6 μm, or from 2 to 50 μm, or from 3 to 50 μm, or from 3 to 30 μm, or from 3 to 15 μm, or from 5 to 50 μm, μm or from 5 to 25 μm, or from 10 to 50 μm, or from 10 to 35 μm, or from 15 to 50 μm, or from 15 to 30 μm.

The hard coat layer can have a high modulus and hardness. The hard coat layer can have a pencil hardness at least 9B, or at least 8B, or at least 7B, or at least 6B, or at least 5B, or at least 4B, or at least 3B, or at least 2B, or at least B, or at least HB, or at least F, or at least H, or at least 2H, or at least 3H, or at least 4H, or at least 5H, or at least 6H, or at least 7H, or at least 8H, or at least 9H. The pencil hardness is measured with a hard coat layer disposed on glass. The hard coat layer has a nanoindentation modulus of at least 3 GPa, or at least 4 GPa, or at least 8 GPa.

In one embodiment, a cover window for an infolding flexible display can include a hard coat layer and a multilayer polymer film, wherein the multilayer polymer film has an CAB' type layer construction and the hard coat layer is adhered to the 'A' layer. In one embodiment, the 'A' layer can have a higher modulus than both the 'B' layer and the hard coat layer. In one embodiment, when designing a cover window, a safety factor may be incorporated to better insure that the failure strain of the cover window is not reached over the lifetime of the device. In one embodiment, a cover window can be designed with a safety factor of 25%. In other embodiments, the safety factor can be higher or lower. For example, a cover window can be designed for a device with an infold bending radius of R=0.5 mm where the hard coat layer has a modulus of 3750 MPa with a thickness of 5 μm and the 'B' layer has a modulus of 6340 MPa. Using a safety factor of 25%, the calculation radius for bending would be decreased to 0.4 mm for this design. The 'B' layer can be a polyimide composition, and the 'A' layer can be the same polyimide composition with the addition of nanoparticles, such as silicon oxide nanoparticles, that increases the modulus of the 'A' layer to 5% (6639 MPa), to 10% (6948 MPa), to 15% (7264 MPa) or to 25% (7900 MPa) higher than the modulus of the 'B' layer. In such a configuration, the relative thicknesses of the polymer layers can be defined in a design process, adjusting them over a range that maintains the integrity of the cover window so as to avoid strain bending failure in the 'A' layer or bending failure in the 'B' layer at R=0.5 mm bending radius during dynamic bending testing. Table 1 summarizes a range of useful thicknesses for the 'A' and 'B' layer for a multilayer film in this cover window configuration (having a safety factor of 25%).

For the strain failure, "No" means that there is no evidence of polymer cracking observed under high-magnification microscopy following dynamic bending testing of the cover window construction described, i.e., the design remains below the failure strain of the materials in the layers. A "Yes" means that the design would experience higher than the design allowable strain and could exhibit observable damage under high-magnification microscopy, a result of bending strain applied to the 'A' layer or the 'B' layer or later below, the 'C' layer, or some combination of these strains.

TABLE 1

| bending radius (mm) | Hard coat | | A layer | | B layer | | Strain failure |
|---|---|---|---|---|---|---|---|
| | E (MPa) | t (µm) | E (MPa) | t (µm) | E (MPa) | t (µm) | |
| 0.5 | 3750 | 5 | 6639 | 2 | 6340 | 12 | No |
| 0.5 | 3750 | 5 | 6639 | 6 | 6340 | 8 | No |
| 0.5 | 3750 | 5 | 6639 | 12 | 6340 | 2 | No |
| 0.5 | 3750 | 5 | 6948 | 2 | 6340 | 12 | No |
| 0.5 | 3750 | 5 | 6948 | 6 | 6340 | 8 | No |
| 0.5 | 3750 | 5 | 6948 | 12 | 6340 | 2 | No |
| 0.5 | 3750 | 5 | 7264 | 2 | 6340 | 12 | No |
| 0.5 | 3750 | 5 | 7264 | 6 | 6340 | 8 | No |
| 0.5 | 3750 | 5 | 7264 | 12 | 6340 | 2 | No |
| 0.5 | 3750 | 5 | 7900 | 2 | 6340 | 12 | No |
| 0.5 | 3750 | 5 | 7900 | 6 | 6340 | 8 | No |
| 0.5 | 3750 | 5 | 7900 | 12 | 6340 | 2 | No |

In another embodiment, this same construction can be used for a cover window with an infold bending radius of R=1.0 mm. Table 2 summarizes a range of useful thicknesses for the 'A' and 'B' layer for a multilayer film in this cover window configuration having a safety factor of 25% (using 0.8 mm as a bending radius in these design calculations).

TABLE 2

| bending radius (mm) | Hard coat | | A layer | | B layer | | Strain failure |
|---|---|---|---|---|---|---|---|
| | E (MPa) | t (µm) | E (MPa) | t (µm) | E (MPa) | t (µm) | |
| 1.0 | 3750 | 5 | 6639 | 5 | 6340 | 27 | No |
| 1.0 | 3750 | 5 | 6639 | 15 | 6340 | 17 | No |
| 1.0 | 3750 | 5 | 6639 | 30 | 6340 | 2 | No |
| 1.0 | 3750 | 5 | 6948 | 5 | 6340 | 27 | No |
| 1.0 | 3750 | 5 | 6948 | 15 | 6340 | 16 | No |
| 1.0 | 3750 | 5 | 6948 | 30 | 6340 | 2 | No |
| 1.0 | 3750 | 5 | 7264 | 5 | 6340 | 26 | No |
| 1.0 | 3750 | 5 | 7264 | 15 | 6340 | 16 | No |
| 1.0 | 3750 | 5 | 7264 | 25 | 6340 | 6 | No |
| 1.0 | 3750 | 5 | 7264 | 30 | 6340 | 2 | Yes |
| 1.0 | 3750 | 5 | 7900 | 5 | 6340 | 26 | No |
| 1.0 | 3750 | 5 | 7900 | 15 | 6340 | 16 | No |
| 1.0 | 3750 | 5 | 7900 | 25 | 6340 | 6 | No |
| 1.0 | 3750 | 5 | 7900 | 30 | 6340 | 2 | Yes |

In another embodiment, this same construction can be used for a cover window with an infold bending radius of R=1.5 mm. Table 3 summarizes a range of useful thicknesses for the 'A' and 'B' layer for a multilayer film in this cover window configuration having a safety factor of 25% (using 1.2 mm as a bending radius in these design calculations).

TABLE 3

| bending radius (mm) | Hard coat | | A layer | | B layer | | Strain failure |
|---|---|---|---|---|---|---|---|
| | E (MPa) | t (µm) | E (MPa) | t (µm) | E (MPa) | t (µm) | |
| 1.5 | 3750 | 5 | 6639 | 5 | 6340 | 44 | No |
| 1.5 | 3750 | 5 | 6639 | 20 | 6340 | 29 | No |
| 1.5 | 3750 | 5 | 6639 | 45 | 6340 | 4 | No |
| 1.5 | 3750 | 5 | 6948 | 5 | 6340 | 44 | No |
| 1.5 | 3750 | 5 | 6948 | 20 | 6340 | 29 | No |
| 1.5 | 3750 | 5 | 6948 | 45 | 6340 | 4 | No |
| 1.5 | 3750 | 5 | 7264 | 5 | 6340 | 44 | No |
| 1.5 | 3750 | 5 | 7264 | 20 | 6340 | 28 | No |
| 1.5 | 3750 | 5 | 7264 | 45 | 6340 | 4 | No |
| 1.5 | 3750 | 5 | 7900 | 5 | 6340 | 44 | No |
| 1.5 | 3750 | 5 | 7900 | 20 | 6340 | 27 | No |
| 1.5 | 3750 | 5 | 7900 | 40 | 6340 | 9 | No |
| 1.5 | 3750 | 5 | 7900 | 45 | 6340 | 4 | Yes |

In another embodiment, this same construction can be used for a cover window with an infold bending radius of R=2.5 mm. Table 4 summarizes a range of useful thicknesses for the 'A' and 'B' layer for a multilayer film in this cover window configuration having a safety factor of 25% (using 2.0 mm as a bending radius in these design calculations).

TABLE 4

| bending radius (mm) | Hard coat | | A layer | | B layer | | Strain failure |
|---|---|---|---|---|---|---|---|
| | E (MPa) | t (µm) | E (MPa) | t (µm) | E (MPa) | t (µm) | |
| 2.5 | 3750 | 5 | 6639 | 10 | 6340 | 74 | No |
| 2.5 | 3750 | 5 | 6639 | 40 | 6340 | 44 | No |
| 2.5 | 3750 | 5 | 6639 | 80 | 6340 | 5 | No |
| 2.5 | 3750 | 5 | 6948 | 10 | 6340 | 74 | No |
| 2.5 | 3750 | 5 | 6948 | 40 | 6340 | 43 | No |
| 2.5 | 3750 | 5 | 6948 | 80 | 6340 | 5 | No |
| 2.5 | 3750 | 5 | 7264 | 10 | 6340 | 74 | No |
| 2.5 | 3750 | 5 | 7264 | 40 | 6340 | 42 | No |
| 2.5 | 3750 | 5 | 7264 | 70 | 6340 | 14 | No |
| 2.5 | 3750 | 5 | 7264 | 80 | 6340 | 5 | Yes |
| 2.5 | 3750 | 5 | 7900 | 10 | 6340 | 73 | No |
| 2.5 | 3750 | 5 | 7900 | 40 | 6340 | 41 | No |
| 2.5 | 3750 | 5 | 7900 | 70 | 6340 | 13 | No |
| 2.5 | 3750 | 5 | 7900 | 80 | 6340 | 4 | Yes |

In another embodiment, this same construction can be used for a cover window with an infold bending radius of R=4.0 mm. Table 5 summarizes a range of useful thicknesses for the 'A' and 'B' layer for a multilayer film in this cover window configuration having a safety factor of 25% (using 3.2 mm as a bending radius in these design calculations).

TABLE 5

| bending radius (mm) | Hard coat | | A layer | | B layer | | Strain failure |
|---|---|---|---|---|---|---|---|
| | E (MPa) | t (µm) | E (MPa) | t (µm) | E (MPa) | t (µm) | |
| 4.0 | 3750 | 5 | 6639 | 20 | 6340 | 117 | No |
| 4.0 | 3750 | 5 | 6639 | 60 | 6340 | 76 | No |
| 4.0 | 3750 | 5 | 6639 | 120 | 6340 | 17 | No |
| 4.0 | 3750 | 5 | 6639 | 130 | 6340 | 8 | No |
| 4.0 | 3750 | 5 | 6639 | 130 | 6340 | 10 | Yes |

TABLE 5-continued

| bending radius (mm) | Hard coat E (MPa) | Hard coat t (μm) | A layer E (MPa) | A layer t (μm) | B layer E (MPa) | B layer t (μm) | Strain failure |
|---|---|---|---|---|---|---|---|
| 4.0 | 3750 | 5 | 6948 | 20 | 6340 | 116 | No |
| 4.0 | 3750 | 5 | 6948 | 60 | 6340 | 75 | No |
| 4.0 | 3750 | 5 | 6948 | 120 | 6340 | 16 | No |
| 4.0 | 3750 | 5 | 6948 | 130 | 6340 | 7 | Yes |
| 4.0 | 3750 | 5 | 6948 | 130 | 6340 | 10 | Yes |
| 4.0 | 3750 | 5 | 7264 | 20 | 6340 | 115 | No |
| 4.0 | 3750 | 5 | 7264 | 60 | 6340 | 73 | No |
| 4.0 | 3750 | 5 | 7264 | 120 | 6340 | 16 | No |
| 4.0 | 3750 | 5 | 7264 | 130 | 6340 | 7 | Yes |
| 4.0 | 3750 | 5 | 7264 | 130 | 6340 | 10 | Yes |
| 4.0 | 3750 | 5 | 7900 | 20 | 6340 | 114 | No |
| 4.0 | 3750 | 5 | 7900 | 60 | 6340 | 71 | No |
| 4.0 | 3750 | 5 | 7900 | 120 | 6340 | 15 | No |
| 4.0 | 3750 | 5 | 7900 | 130 | 6340 | 7 | Yes |
| 4.0 | 3750 | 5 | 7900 | 130 | 6340 | 10 | Yes |

As demonstrated in Tables 1 to 5, multilayer polymer films for cover windows in flexible displays can be designed for a range of infold bending radii depending on the moduli and thicknesses of the hard coat and individual polymer layers.

In one embodiment, a cover window for an infolding flexible display can include a hard coat layer and a multilayer polymer film, wherein the multilayer polymer film has an 'ABC' type layer construction and the hard coat layer is adhered to the 'A' layer. In one embodiment, the 'A' layer can have a higher modulus than both the 'B' layer and the hard coat layer, and the CB' layer can have a higher modulus than the 'C' layer. For example, a cover window can be designed for a device with an infold bending radius of R=1.5 mm, where the hard coat layer has a modulus of 3750 MPa with a thickness of 5 μm. Using a safety factor of 25%, the calculation radius for bending would be decreased to 1.2 mm for this design. The 'C' layer can be a polyimide composition with a modulus of 6340 MPa, the 'B' layer can be the same polyimide composition with the addition of an inorganic nanoparticle, such as silicon oxide nanoparticles, that increases the modulus of the CB' layer to be 5% (6639 MPa) higher than the modulus of the 'C' layer, and the 'A' layer can also be the same polyimide composition and contain the inorganic nanoparticles of the 'B' layer, but have a modulus 25% (7900 MPa) higher than the modulus of the 'C' layer. In such a configuration, the relative thicknesses of the polymer layers can be adjusted over a range that maintains the integrity of the cover window to avoid bending strain failure at this bending radius during dynamic bending. Table 6 summarizes a range of useful thicknesses for the 'A', 'B' and 'C' layers for a multilayer film in this cover window configuration having a safety factor of 25% (using 1.2 mm as a bending radius in these design calculations).

TABLE 6

| bending radius (mm) | Hard coat E (MPa) | Hard coat t (μm) | A layer E (MPa) | A layer t (μm) | B layer E (MPa) | B layer t (μm) | C layer E (MPa) | C layer t (μm) | Strain failure |
|---|---|---|---|---|---|---|---|---|---|
| 1.5 | 3750 | 5 | 7900 | 10 | 6639 | 10 | 6340 | 28 | No |
| 1.5 | 3750 | 5 | 7900 | 20 | 6639 | 10 | 6340 | 17 | No |
| 1.5 | 3750 | 5 | 7900 | 30 | 6639 | 10 | 6340 | 8 | No |
| 1.5 | 3750 | 5 | 7900 | 35 | 6639 | 10 | 6340 | 3 | Yes |
| 1.5 | 3750 | 5 | 7900 | 10 | 6639 | 5 | 6340 | 33 | No |
| 1.5 | 3750 | 5 | 7900 | 20 | 6639 | 5 | 6340 | 22 | No |

TABLE 6-continued

| bending radius (mm) | Hard coat E (MPa) | Hard coat t (μm) | A layer E (MPa) | A layer t (μm) | B layer E (MPa) | B layer t (μm) | C layer E (MPa) | C layer t (μm) | Strain failure |
|---|---|---|---|---|---|---|---|---|---|
| 1.5 | 3750 | 5 | 7900 | 35 | 6639 | 5 | 6340 | 8 | No |
| 1.5 | 3750 | 5 | 7900 | 40 | 6639 | 5 | 6340 | 4 | Yes |

In one embodiment, a cover window for an outfolding flexible display can include a hard coat layer and a multilayer polymer film, wherein the multilayer polymer film has an 'AB' type layer construction and the hard coat layer is adhered to the 'A' layer. In one embodiment, the 'A' layer can have a lower modulus than the 'B' layer and a higher modulus than the hard coat layer. For example, a cover window can be designed for a device with an outfold bending radius of R=4.0 mm, where the hard coat layer has a modulus of 3750 MPa with a thickness of 5 μm and the 'A' layer has a modulus of 6340 MPa. The 'A' layer can be a polyimide composition, and the 'B' layer can be the same polyimide composition with the addition of an inorganic nanoparticle, such as silicon oxide nanoparticles, that increases the modulus of the 'B' layer to be 5% (6639 MPa), to 10% (6948 MPa), to 15% (7264 MPa) or to 25% (7900 MPa) higher than the modulus of the 'A' layer. In such a configuration, the relative thicknesses of the polymer layers can be adjusted over a range that maintains the integrity of the cover window to avoid bending strain failure at this bending radius during dynamic bending. Table 7 summarizes a range of useful thicknesses for the 'A' and 'B' layer for a multilayer film in this cover window configuration.

TABLE 7

| bending radius (mm) | Hard coat E (MPa) | Hard coat t (μm) | A layer E (MPa) | A layer t (μm) | B layer E (MPa) | B layer t (μm) | Strain failure |
|---|---|---|---|---|---|---|---|
| 4.0 | 3750 | 5 | 6340 | 20 | 6639 | 122 | No |
| 4.0 | 3750 | 5 | 6340 | 60 | 6639 | 82 | No |
| 4.0 | 3750 | 5 | 6340 | 100 | 6639 | 42 | No |
| 4.0 | 3750 | 5 | 6340 | 130 | 6639 | 13 | No |
| 4.0 | 3750 | 5 | 6340 | 20 | 6948 | 122 | No |
| 4.0 | 3750 | 5 | 6340 | 60 | 6948 | 80 | No |
| 4.0 | 3750 | 5 | 6340 | 100 | 6948 | 41 | No |
| 4.0 | 3750 | 5 | 6340 | 130 | 6948 | 12 | No |
| 4.0 | 3750 | 5 | 6340 | 20 | 7264 | 121 | No |
| 4.0 | 3750 | 5 | 6340 | 60 | 7264 | 79 | No |
| 4.0 | 3750 | 5 | 6340 | 100 | 7264 | 39 | No |
| 4.0 | 3750 | 5 | 6340 | 130 | 7264 | 12 | No |
| 4.0 | 3750 | 5 | 6340 | 20 | 7900 | 119 | No |
| 4.0 | 3750 | 5 | 6340 | 60 | 7900 | 76 | No |
| 4.0 | 3750 | 5 | 6340 | 100 | 7900 | 37 | No |
| 4.0 | 3750 | 5 | 6340 | 130 | 7900 | 11 | No |

In one embodiment, a cover window can be designed such that, during bending (at the design radius or larger), at least one of the polymer layers of the multilayer polymer film does not experience any longitudinal tensile strain. When folding, some layers of a multilayer polymer film can experience longitudinal compressive strains, while other layers can experience longitudinal tensile strains. The strain distribution during bending at the design radius depends on the bending direction and the layer arrangement. Layers with lower strain to failure can be susceptible to tensile failure at lower strains, and thus more susceptible to cracking or other types of bending failure. By controlling the thicknesses, moduli, and arrangement of the individual layers, a multilayer polymer film can be designed where, at a particular bending radius, one layer in the cover window will only experience compressive strains during folding of a device. For an infold display device, this would be a layer further away from the display, i.e., at or near the "top" of the cover window stack, while for an outfold display device, this would be a layer closer to the display, i.e., at or near the "bottom" of the cover window stack.

Those skilled in the art will appreciate the enormous number of design possibilities available for infold and outfold devices, depending on the desired bending radius of the device and the elastic moduli of the materials used for the various layers. The advantageous properties of this invention can be observed by reference to the following examples that illustrate, but do not limit, the invention. All parts and percentages are by weight unless otherwise indicated.

EXAMPLES

Test Methods

Indentation Modulus and Hardness

For Examples 1 and 2, the elastic modulus was measured using a nanoindenter specially configured to measure the stiffness of films. Nanoindentation measures a transverse modulus with some in-plane modulus component, ideal for a thin film. A nanoindenter (Hysitron TI 980 TriboIndenter, Bruker, Minneapolis, Minn.) was used to characterize the film indentation modulus. The nanoindenter had load and displacement resolutions of 1 nN and 0.04 nm, respectively, and was operated in continuous stiffness mode whereby the indenter tip was continuously oscillated at a 1-2 nm amplitude for improved surface detection and extraction from a single measurement of mechanical properties as a function of indentation depth. A standard (three-sided pyramidal) Berkovich tip whose projected contact area function was calibrated to an indentation depth from 50 nm and above by making 20 to 25 indentations on each specimen. The indicated films were mounted on sample holders using an adhesive to sample mounts. Indentations were made on each coating in at least six different locations once the test system had reached a thermal drift of ~0.1-0.2 nm/sec. After measurements, subsequent to the measurement, three to five indentations were again made on the specimen to verify the previous calibration.

For Examples 3 to 17 and Comparative Example 1, the nanoindenter was used to measure the film mechanical properties in the out-of-plane direction. The standard (three-sided pyramidal) Berkovich tip whose projected contact area function was calibrated prior to testing the films was used to make the impressions during load-hold-unload cycles for individual tests. Samples were prepared and tested according to ISO 14577. Films were mounted on sample holders using a rigid adhesive. Indentations were made on each coating in at least five different locations with a minimum distance of 25 times the maximum indentation depth between the adjacent indents. The indentation modulus values were calculated from the load-depth data at the onset of unloading according to the Oliver-Pharr method. The hardness values were calculated by dividing the maximum load by the corresponding projected contact area of the tip.

Tensile Mechanical Properties

Tensile mechanical properties were measured using an MTS Criterion® frame with a 500N load cell and an external noncontact extensometer. Tensile coupons with an aspect ratio of eight were prepared and tested according to ASTM D882. Tensile modulus was measured for the initial linear portion of the stress-strain curves. The yield strain was calculated using the 0.2% offset method.

Interlaminar Fracture Toughness in Mode I ($G_{Ic}$)

Interfacial bond strength was measured with a double-cantilever beam test. The test uses a 1"×6" multilayer film specimen. This specimen was adhered top and bottom with 1"×6" aluminum backing bars to limit the sample deflection under load, and to attach to loading blocks. The result is a sandwich as follows: Al bar/'A' Layer/'B' layer/'A' layer/Al bar. Then, loading blocks were attached to the aluminum backing bars top and bottom. The samples were tested in an ElectroForce 1000 load frame equipped with a 1000 lb load cell. The test purposefully creates an initial crack between the weakest layers and propagates that crack along the interface while measuring the transverse load, the opening displacement, and the crack length along the specimen long axis. If the crack can be easily created, the interfacial adhesion is low or modest and $G_{Ic}$ can be measured. If the crack cannot be created, the interlaminar adhesion is high, or is not adhesion at all, but instead consolidation. A fully consolidated tri-layer stack should not be able to be separated. The locus of failure should be elsewhere.

Thickness

For Examples 1 and 2, cross-sectional scanning electron microscope (SEM) images of films were obtained to determine the thicknesses of the multilayer films and the individual film layers. Film samples were cut and mounted in an epoxy and allowed to dry overnight. The samples were then polished using a Buehler variable speed grinder/polisher and placed into a desiccator for about two hours to ensure dryness. Images were captured using a Hitachi S-3400 SEM (Hitachi High Technologies America, Inc., Schaumburg, Ill.) under variable pressure.

For Examples 3 to 17 and Comparative Example 1, coating thickness was determined by measuring coated and uncoated samples in 5 positions across the profile of the film using a contact-type FISCHERSCOPE MMS PC2 modular measurement system thickness gauge (Fisher Technology Inc., Windsor, Conn.).

Bending Durability

Bending durability of cover windows was measured in two ways: dynamic bending test and static bending test. Dynamic bending test was run at room temperature. Cover window samples were cut to 0.5×4 inch using a 355 nm wavelength laser cutter (ProtoLaser U3 laser micromachining system, LPKF Laser & Electronics AG, Garbsen, Germany) to ensure smooth edges, mounted onto a cyclic bending tester (U-shaped tension-free bend tester, Yuasa System Co., Ltd., Japan) and fold tested at 0.5 Hz for 200,000 cycles at specified radii of 1.5, 1.3 and 1.2 mm. At the end of the cycles, cover window samples were inspected with a high magnification microscope for any film damage such as film cracking, interface delamination and film deformation. Static bending was run at 60° C. and 90% relative humidity to evaluate sample bending durability under environmental conditions, using the same sample preparation as the dynamic bending test. Cover window samples were mounted by being bent between two parallel plates at a plate-to-plate distance equal to twice the bending radius, and then placed in the environmental chamber. After 10 days bent inside the environmental chamber, samples were taken out and inspected for any film damage (delamination, cracking) and deformation (warp angle) under high magnification microscope.

Scratch Resistance

Scratch resistance of cover windows was measured using a reciprocating abraser (TABER® Reciprocating Abraser (Abrader)—Model 5900, Taber Industries, N. Tonawanda, N.Y.) with steel wool as abradant (Bonstar superfine grade #0000, 10 mm±2.5 mm thick). A cover window sample, cut to about 3×4 inch size, was taped down onto a thick glass plate on all four edges, and placed onto the abraser stage. A brand-new steel wool pad of 2×2 $cm^2$ size was first conditioned by scratching 100 cycles on a 100 urn thick PET sheet, and then used for sample testing. The pre-conditioned steel wool pad was placed on top of the cover window sample, and the 1×1 $cm^2$ collet was lowered to be right above the steel wool pad. A 1 kg weight was then placed over the collet as the test load. Scratch speed was set at 25 cycles per minute with a stroke distance of 1 inch. The cover window sample was inspected for scratch damage both visually and under optical and laser confocal microscopes for damage profile analysis at incremental steps, such as 0 cycles, 10 cycles, 50 cycles, 100 cycles, 500 cycles, 1000 cycles, 3000 cycles, etc. Water contact angle measurement were also carried out at each check point to assess the surface damage.

Water Contact Angle

Water contact angle of cover windows was measured using a drop shape analyzer (DSA100, KRÜSS GmbH, Hamburg, Germany). The cover window sample, mounted on a thick glass plate as described above for the scratch resistance test, was placed onto the drop shape analyzer stage. A needle that can dispense a 1 µL water droplet was set up above the sample at a defined height. Water contact angle of the droplet on the cover window sample surface was measured in static mode using an ellipse fitting method.

Transverse Puncture

The cover windows were testing in transverse puncture using a quasi statis (QS) transverse puncture test. This is also called a macroindentation test. In the test, a 500 µm spherical tip indenter is used. The puncture test is carried out at a loading rate of 10 µm/sec or 33 µm/sec.

Example 1

For Example 1 (E1), multilayer films were cast by co-extrusion to form 'ABA' type layers by consolidation. Three separate polyamic polymer streams were simultaneously extruded through a multi-cavity extrusion die onto a heated moving belt to form a co-extruded three-layer polyamic acid film that can be cured to form a three-layer polyimide film. The thicknesses of the polyimide core layer (second transparent, colorless polymer layer) and the top and bottom outer layers (first and third transparent, colorless polymer layers) were adjusted by varying the amounts of polyamic acids fed to the extruder. Silicon oxide nanoparticles were introduced into the outer CA' layers, to increase the layer modulus.

To prepare the core layer (second transparent, colorless polymer layer), in a nitrogen purged 80-gallon reactor, 16.20 kg of trifluoromethyl-benzidine (TFMB, Seika Corporation, Wakayam Seika Kogyo Co., LTD., Japan) and 143.34 kg of dimethyl acetamide (DMAC) were stirred and agitated. 21.91 kg of 4,4'-(hexafluoroisopropylidene)diphthalic anhydride (6FDA, Synasia, Metuchen, N.J.) were added in four separate aliquots over a 6 hours period. The reaction mixture was maintained at ~40° C. during this procedure. Eight additional aliquots of 36.145 g of 6FDA were added to the reaction mixture over a period of ~3 hours. The viscosity of the pre-polymer was ~60 poise.

A portion of the polymer was polymerized ("finished") to ~1200-1300 poise using a mixture of 6 wt % pyromellitic dianhydride (PMDA) in DMAC in a nitrogen purged reactor. The material was polymerized with the PMDA solution over the course of ~24 hours at 40° C.

To prepare the outer polymer layers (first and third transparent, colorless polymer layers), a portion of the polymer used in the core layer was also co-extruded in the outer skin layer. However, this layer was co-mingled with a stream of silicon oxide nanoparticles. The silicon oxide nanocolloid was injected into this outer layer. The colloid contains silicon oxide nanoparticles which are ~20-30 nm in diameter and are colloidally dispersed at ~31 wt % in DMAC. The product was derived from a Ludox® TMA colloid silica product in water (Sigma-Aldrich, St. Louis, Mo.). The colloid was deionized (Na ions removed) by exchanging with Dowex® HCR-W2 resin (hydrogen form, Sigma-Aldrich). The deionized Ludox® TMA was exchanged into DMAC solvent by distillation. During the final part of the exchange, a trimethoxy phenylsilane capping agent was introduced into the colloid mixture to functionalize the nanoparticles. The nanoparticle stream was introduced at the required volumetric rate to create a silicon oxide nanoparticle enriched outer layer, with ~13 vol % $SiO_2$ nanoparticles.

The multilayer polymer film was formed by co-extrusion. The flow rates of the polyamic acid solutions were adjusted to yield a three-layer co-extruded film, in which the outer layers were ~5-6 µm after drying. The inner core layer was ~35-36 µm. The extruded multilayer polymer film was dried at an oven temperature in the range of from about 95 to about 150° C. to produce a green film containing some DMAC solvent.

The dried film was mounted on a 3×8-inch pin frame to secure it and placed in a furnace (Thermolyne™ F6000 box furnace, Thermo Fisher Scientific, Inc., Waltham, Mass.). The furnace was nitrogen purged and heated according to the following temperature protocol:

25 to 45° C. (5° C./min), hold at 45° C. for 5 minutes;
45 to 150° C. (20° C./min), hold at 150° C. for 10 minutes;
150 to 250° C. (20° C./min), hold at 250° C. for 10 minutes;
250 to 350° C. (20° C./min), hold at 350° C. for 5 minutes.

The films were removed "hot" from the oven after heating to 350° C. for 5 minutes and allowed to cool in air.

Example 2

For Example 2 (E2), the same procedures as described in E1 were used, except that the flow rate of the silicon oxide colloid was increased to increase the concentration of silicon oxide nanoparticles in the outer layers to ~18 vol %.

High resolution microscopy was used to observe the interfaces between the layers of the multilayer polymer films. Films were prepared as described above in E1 and E2, except that instead of curing the films in a furnace, self-supported films were heated with radiant heaters in a tenter oven from about 180 to about 620° C. (radiant heater surface temperature) to completely dry and imidized the polymers. Samples were prepared by ultra-microtome to capture transmission electron microscopy (TEM) cross-section images of the films. The transition regions from the outer layers and the core is very gradual. Some silicon oxide nanoparticles are present in this interface region, and there is no clear boundary between the outer layers and the core layer. This microstructure results in high adhesion between the outer and the core layers due to bonding by consolidation.

In both E1 and E2, the nanoindentation modulus of the unreinforced CB' layer was 4.53 GPa. In the case with the higher level of particle reinforcement, the 'A' layer measured 5.57 GPa modulus, some 23% higher than the modulus of the 'A' layer. In the case with the lower level of particle reinforcement, the 'A' layer measured 5.46 GPa modulus, some 21% higher than the modulus of the 'A' layer (Table 8).

TABLE 8

| Example | Layers | Vol % SiO$_2$ in Layer A | Vol % SiO$_2$ in Layer B | Avg. Modulus in Layer A (GPa) | Avg. Modulus Layer in B (GPa) |
|---|---|---|---|---|---|
| E1 | A/B/A | 18.3 | 0 | 5.57 | 4.53 |
| E2 | A/B/A | 13.3 | 0 | 5.46 | 4.53 |

Interfacial strength of both E1 and E2 was the same or nearly the same as the strength of the parent material as measured by a interlaminar fracture toughness test in Mode I ($G_{Ic}$). Our attempt to measure the weakest $G_{Ic}$ of the consolidated tri-layer structure using the double-cantilever beam test was unsuccessful due to the strength of the interfaces. We were unable to create the initial crack region between the consolidated interfaces. Instead, the locus of failure was in the epoxy layer used to join the consolidated structure to the aluminum beams. Thus, we know the $G_{Ic}$ of the consolidated interfaces is higher than that of the epoxy-aluminum interface. Previous studies Alfano et al., "Analysis of Fracture in Aluminum Joints Bonded with a Bi-Component Epoxy Adhesive," Journal of Testing and Evaluation, Vol. 39, No. 2, 2010) reports $G_{Ic}$ values of around 2000 J/m$^2$ for a similar Aluminum/Epoxy interface. This suggests that the interfaces of the consolidated interfaces of the tested sample was higher than 2000 J/m$^2$.

Example 3

For Example 3 (E3), to prepare a polyamic acid solution with a monomer composition of CBDA 0.6/6FDA 0.4// TFMB 1.0, into a 72-L nitrogen purged resin kettle, 2.268 kg of TFMB was added along with 35.191 kg DMAC (<300 ppm H$_2$O). 1.252 kg of 6FDA (Daikin America, Orangeburg, N.Y.) and 0.829 kg of cyclobutane-1,2,3,4-tetracarboxylic dianhydride (cyclobutane dianhydride, CBDA, Wilshire Technologies, Princeton, N.J.) were added in three aliquots over three 60-minute intervals. The reaction mixture was held at 40° C. during these additions. The polymer was polymerized ("finished") to ~13.2 poise using small additions of 6FDA powder.

To prepare a polymer solution, an additional 2.787 kg of DMAC was added and stirred for 60 minutes. 1.650 kg of beta-picoline and 1.808 kg of acetic anhydride were then combined with the polyamic acid solution in four aliquots over 2 hours. The reaction mixture was heated to 80° C. and then stirred for 2 hours before allowing to cool to room temperature.

43.0 g of cooled polymer solution was poured into 100 g of rapidly stirring methanol in a blender. The pulverized polymer solid was allowed to stir in the blender for 10 minutes before collection by filtration. The polymer was dried under vacuum at 25° C. for ~16 hour to form the final resin.

To prepare a silicon oxide colloid, an aqueous silica colloid (Ludox® TMA, a slightly acidic form of SiO$_2$ colloid described in Example 1, 34 wt % in water, (ph ~7.0), W.R. Grace and Co., Columbia Md.) was used. 762 kg of this colloid was combined with 701 kg of DMAc (99.8%) in a 500-gallon distillation reactor. Water was distilled from the colloid until a water level of 0.5-1 wt % was achieved (distillation temperature ~100° C.). 25.4 kg of phenyltrimethoxysilane (Dow Corning, Midland, Mich.) was added to this reaction mixture, and the reactor was further heated at a temperature of ~100° C. until the water level was <800 ppm. The final colloid concentration was ~31.44 wt %.

For a 40 wt % filled A layer, a coating solution was prepared using 2.99 g of the dried resin combined with 22.55 g of DMAC solvent in a centrifugal-planetary mixer (Thinky USA, Laguna Hills, Calif.). The solution was agitated for 8 minutes to dissolve the resin. 6.66 g of SiO$_2$ colloid was added and the mixture was agitated for an additional 8 minutes to mix and de-gas the formulation. To 26 g of this formulation, an additional 5 g of DMAC was added.

For an unfilled B layer, a coating solution was prepared using 7.03 g of the polymer resin combined with 63.1 g of DMAC and mixed for 8 minutes in the centrifugal-planetary mixer to create the coating formulation.

The solutions were filtered through a 5 µm (25 mm diameter) nylon syringe disk filter using a Nordson filtration system pressurized with 30 psig nitrogen gas.

To form an AB multilayer film, the coating solution of composition B was cast on a glass substrate at 25° C. using a doctor blade with a 40 mm clearance to produce an ~2 mil film after curing. The film on the glass substrate was heated to 50° C. for 30 minutes, then to 80° C. for 30 minutes on a hotplate. The film was allowed to cool to room temperature. A second layer was cast with solution A on top of the first using a doctor blade with an 8 mm clearance. The top layer covered only 75% of the bottom layer to allow for measurement of the thickness of the bottom layer and to determine the layer thicknesses. The coating was placed onto a hotplate and heated to 50° C. for 30 minutes, then to 80° C. for 30 minutes in air. The film was released using a razor and mounted onto a 4×8-inch pin frame and placed in a furnace (Carbolite Gero, Hope, UK). The furnace was then purged with nitrogen and heated according to the following temperature protocol:

25 to 90° C. (7° C./min), hold at 45° C. for 5 minutes;
90 to 150° C. (7° C./min), hold at 150° C. for 10 minutes;
150 to 250° C. (7° C./min), hold at 250° C. for 20 minutes;
The film was removed from the oven after heating to 250° C. for 15 minutes and allowed to cool in air.

Example 4

For Example 4 (E4), the procedures as described in E3 were followed, but the quantities of materials in the coating solutions were modified to form an A layer composition with a different amount of silicon oxide nanoparticles.

For a 60 wt % filled A layer, a coating solution was prepared using 1.63 g of the dried resin combined with 14.68 g of DMAC solvent in the centrifugal-planetary mixer. The solution was agitated for 8 minutes to dissolve the resin. 7.68 g of SiO$_2$ colloid was added, and the mixture was agitated for an additional 8 minutes to mix and de-gas the formulation.

For an unfilled B layer, a coating solution was prepared using 6.9 g of the polymer resin combined with 62.93 g of DMAC and mixed for 8 minutes in the centrifugal-planetary mixer to create the coating formulation.

TABLE 9

| | $SiO_2$ (wt %) | | Thickness (um) | | Indentation Modulus (GPa) | Hardness (GPa) |
|---|---|---|---|---|---|---|
| Example | Layer A | Layer B | Layer A | Layer B | Layer A | Layer A |
| E3 | 40 | 0 | 20 | 50 | 6.9 | 0.59 |
| E4 | 60 | 0 | 20 | 50 | 8.46 | 0.62 |

Example 5

For Example 5 (E5), a polymer solution was prepared in the manner of E3. Approximately 500 g of the polymer solution was added to a 4-liter stainless steel blender container followed by 1000 g of methanol. The blender was sealed, and the contents mixed for several minutes. The liquid portion containing DMAC and catalyst was decanted leaving the finely ground polymer solid in the blender. The polymer solid in the blender container was further pulverized in the presence of 500 g of methanol for several minutes before decanting the liquid portion. This step was repeated one time before collecting the polymer solid by filtration using a Buchner funnel and vacuum. The above steps were repeated until all the polymer solid was isolated. Air was pulled through the consolidated polymer solid while still contained on the Buchner funnel for 16 hours then it was transferred to a vacuum oven and further dried at 50° C. and 12 psi for 16 hours. The dried resin was obtained with a 97.16% yield.

For a 15 wt % filled A layer, a coating solution was prepared by adding 1054.30 g of DMAC to a nitrogen blanketed 1-liter glass reactor fitted with a Teflon® PTFE coated stirrer and thermocouple. 150.53 g of polymer resin was added along with 87.12 g of $SiO_2$ colloid. The mixture was stirred at 150 rpm and heated to 50° C. for 8 hours then gradually cooled to 25° C. and allowed to stir for 19.5 hours to obtain a solution with a viscosity of 152.80 poise. The mixture was diluted with additional DMAC, reaching a final viscosity of 70.46 poise. The formulation was loaded into a Nordson EFD cartridge, pressurized with nitrogen gas and pushed through a Whatman® polypropylene filter capsule with an absolute retention of 0.45 µm prior to coating.

For an unfilled B layer, a coating solution was prepared by dissolving the polymer resin in DMAC to prepare a solution suitable for slot-die coating. A nitrogen blanketed 6-liter glass reactor fitted with a Teflon® PTFE coated stirrer and thermocouple was charged with 3404 g of DMAC and stirred. 500 g of polymer resin was added and the mixture stirred at 150 rpm and heated to 50° C. for 8 hours then gradually cooled to 25° C. and allowed to stir for 22 hours to obtain a solution with viscosity of 180.5 poise. The solution was diluted with additional DMAC, reaching a final viscosity of 68.26 poise and a polymer solid content of 10.75%. The formulation was loaded into a Nordson EFD cartridge, pressurized with nitrogen gas and pushed through a Whatman® polypropylene filter capsule with an absolute retention of 0.45 µm prior to coating.

To form an AB multilayer film, samples were coated using a model B-T Bars Precision Sheet Coater, which was equipped with a 6" wide×20 mil thick slot-shim. The air gap was set at 1.5× the wet-coating thickness and adjusted as necessary to compensate for the thickness of previously coated layers. Coating speeds were varied from 5-12 cm/minute to maintain a pump flow rate of less than 6 ml/minute. Samples were coated onto Corning® Eagle XG® glass. After each coating, the sample was soft-baked at progressively higher temperatures using a series of 6 hot-plates (5 minutes at each temperature: 75, 80, 85, 90, 95, and 100° C.). Subsequent layers were coated after the previous layer was fully soft-baked. For some constructions, the B-layer was coated first while for others (noted as reverse laydown) the A-layer was coated first. E5 was cast in the reverse laydown. The samples were fully dried in a furnace (HTCR6/95, Carbolite Gero, Hope, UK) under nitrogen purge (2.7 SCFM). The heating profile consisted of a 5° C./minute ramp to 50° C. followed by a 20-minute hold, and a 5° C./minute ramp to 265° C. followed by a 60-minute hold. Following this heating profile, the samples was removed from the oven and allowed to cool to room temperature in air. Samples were removed from the support glass by prying the edge of the film with a razor blade. The filled A layer was ~15 µm thick, and the unfilled B layer was ~20 µm thick.

Examples 6 and 7

For Examples 6 and 7 (E6 and E7), a polymer solution was prepared in the manner of E3. 9 kg of the polymer solution was diluted with 9 kg of acetone under nitrogen atmosphere. To this stirred solution was added 13.5 kg of methanol over a period of 3-4 hours. The resulting mixture was allowed to break down, while stirring, and then treated with 6 kg of a hardening solution of 25 wt % methanol in distilled water over 30 minutes. The resulting slurry was aged for 60 minutes and the solids recovered via filtration. The solids were subsequently washed three times with a 25 wt % methanol/water mixture and dried under vacuum. A total of 25.195 kg polymer solution was treated to yield approximately 2.164 kg (90%) of solid polymer resin.

For a 20 wt % filled A layer, a coating solution was prepared in the manner of E5, using 1111.70 g DMAC and 180.00 g polymer resin, followed by 147.50 g $SiO_2$ colloid. The mixture was stirred at 150 rpm and heated to 50° C. for 8 hours then gradually cooled to 25° C. and allowed to stir for 22 hours to obtain a solution with viscosity of 152.80 poise. The mixture was diluted with additional DMAC, reaching a final viscosity of 59.70 poise. The formulation was loaded into a Nordson EFD cartridge, pressurized with nitrogen gas and pushed through a Whatman® polypropylene filter capsule with an absolute retention of 0.45 µm prior to coating.

For an unfilled B layer, a coating solution was prepared in the manner of E5, using 4169.11 g DMAC and 596.40 g polymer resin. The mixture was stirred at 150 rpm and heated to 50° C. for 8 hours then gradually cooled to 25° C. and allowed to stir for 22 hours to obtain a solution with viscosity of 76.98 poise. The solution was diluted with additional DMAC, reaching a final viscosity of 63.50 poise. The formulation was loaded into a Nordson EFD cartridge, pressurized with nitrogen gas and pushed through a Whatman® polypropylene filter capsule with an absolute retention of 0.45 µm prior to coating. Films were cast as described in E5. E6 was cast in the normal order, with the B layer first, and E7 was cast in the reverse laydown with the A layer first.

Example 8

For Example 8 (E8), a polymer solution and a resin composition were prepared in the manner of E6. For a 30 wt % filled A layer, a coating solution was prepared in the manner of E6, using 736.79 g DMAC and 114.31 g polymer resin, followed by 160.85 g SiO$_2$ colloid. The solution has a final viscosity of 66.15 poise. For an unfilled B layer, a coating composition was prepared in the manner of E6 to obtain a solution with a final viscosity of 63.50 poise. Films were cast as described in E5 in the reverse laydown.

Table 10 summarizes the tensile properties of E5 to E8.

TABLE 10

| Example | SiO$_2$ (wt %) A layer | SiO$_2$ (wt %) B layer | Thickness (μm) A layer | Thickness (μm) B layer | Casting | Tensile Modulus (GPa) | Tensile Yield Strain (%) |
|---|---|---|---|---|---|---|---|
| E5 | 15 | none | 15 | 20 | reverse | 6.94 | 1.77 |
| E6 | 20 | none | 15 | 20 | normal | 6.65 | 1.83 |
| E7 | 20 | none | 15 | 20 | reverse | 6.97 | 1.73 |
| E8 | 30 | none | 15 | 20 | reverse | 6.73 | 1.86 |

Example 9

For Example 9 (E9), polymer solutions, resin compositions, coating solutions and a multilayer film were prepared as described above for E5, except that the thicknesses of the B layer was ~35 μm.

Examples 10 to 12

For Examples 10 to 12 (E910-E12), polymer solutions, resin compositions, coating solutions and a multilayer film were prepared as described above for E9, except that the coating solution of E6 (20 wt % SiO$_2$) was used for E10 and E11, and the coating solution of E8 (30 wt % SiO$_2$) was used for E12.

Tables 11 and 12 summarize the tensile properties, indentation and hardness properties of E9 to E12.

TABLE 11

| Example | SiO$_2$ (wt %) A layer | SiO$_2$ (wt %) B layer | Thickness (μm) A layer | Thickness (μm) B layer | Casting | Tensile Modulus (GPa) | Tensile Yield Strain (%) |
|---|---|---|---|---|---|---|---|
| E9 | 15 | none | 15 | 35 | reverse | 6.63 | 1.98 |
| E10 | 20 | none | 15 | 35 | normal | 6.38 | 2.01 |
| E11 | 20 | none | 15 | 35 | reverse | 6.38 | 1.90 |
| E12 | 30 | none | 15 | 35 | normal | 6.58 | 2.03 |

TABLE 12

| Example | Indentation Modulus (GPa) A layer | Indentation Modulus (GPa) B layer | Hardness (GPa) A layer | Hardness (GPa) B layer |
|---|---|---|---|---|
| E9 | 5.15 | 4.45 | 0.50 | 0.46 |
| E10 | 5.50 | 4.45 | 0.52 | 0.46 |
| E11 | 5.50 | 4.45 | 0.52 | 0.46 |
| E12 | 6.20 | 4.45 | 0.55 | 0.46 |

Example 13

For Example 13 (E13), polymer solutions, resin compositions, coating solutions and a multilayer film were prepared as described above for E5, except that the thicknesses of the B layer was ~65 μm.

Example 14

For Example 14 (E14), polymer solutions were prepared as described above for E5, as well as the resin composition and coating solution of the unfilled B layer. The resin composition and coating solution for the filled A layer (20 wt % SiO$_2$) were prepared as described for the A layer in E6, and films were cast as described in E5. The thicknesses of layers were ~15 μm for the A layer and ~65 μm for the B layer.

Example 15

For Example 15 (E15), polymer solutions, resin compositions, coating solutions and a multilayer film were prepared as described above for E5, except that the coating solution for the filled A layer (30 wt % SiO$_2$) was prepared as described for the A layer in E8.

Table 13 summarizes the tensile properties of E13 to E15.

TABLE 13

| Example | SiO$_2$ (wt %) A layer | SiO$_2$ (wt %) B layer | Thickness (μm) A layer | Thickness (μm) B layer | Casting | Tensile Modulus (GPa) | Tensile Yield Strain (%) |
|---|---|---|---|---|---|---|---|
| E13 | 15 | none | 15 | 65 | reverse | 6.51 | 1.85 |
| E14 | 20 | none | 15 | 65 | normal | 6.26 | 1.95 |
| E15 | 30 | none | 15 | 65 | normal | 6.52 | 1.81 |

Example 16

For Example 16 (E16), a three-layer (ABC) film was made using the polymer solutions and resin compositions from E6 for the A and B layers. Coating solution A from E6 was used for the A layer (20 wt % SiO$_2$), and coating solution A from E8 was used for the B layer (30 wt % SiO$_2$).

To prepare the polymer solution for the C layer, a polyamic acid solution was prepared in a nitrogen filled 6-liter glass reactor fitted with a Teflon® PTFE coated stirrer and thermocouple. 4012.68 g of DMAC was added to the reactor, stirred at 150 rpm and heated to 40° C. 300.365 g of TFMB was added and allowed to dissolve before adding a mixture of 108.708 g CBDA and 164.168 g of 6FDA in three equal portions. Each portion was allowed to react for approximately 30 minutes before the next portion was added then the reaction was allowed to stir at 40° C. for 21 hours at which point the viscosity was 4.5 poise. An additional 3.840 g of TFMB was dissolved in 27.85 g of DMAC and added. A viscosity of 23.8 poise was obtained after 116 hours.

To prepare the polymer solution, 241.53 g of acetic anhydride and 220.33 g of 3-methylpyridine at 40° C. were combined with the polyamic acid solution. The temperature was then increased to 80° C. and held for 2 hours after which the polymer solution was allowed to cool to 25° C.

Approximately 500 g of the polymer solution was added to a 4-liter stainless steel blender container followed by 1000 g of methanol. The blender was sealed, and the contents mixed for several minutes. The liquid portion containing DMAC and catalyst was decanted leaving the finely ground polymer solid in the blender. The polymer solid in the blender container was further pulverized in the presence of 500 g of methanol for several minutes before decanting the liquid portion. This step was repeated one time before collecting the polymer solid by filtration using a Buchner funnel and vacuum. The above steps were repeated until all of the polymer solid was isolated. Air was pulled through the consolidated polymer solid while contained on the Buchner funnel for 16 hours then it was transferred to a vacuum oven and further dried at 50° C. and 12 psi for 16 hours. The dried resin was obtained with 86.4% yield and Mw 284.431 Daltons, $M_n$ 175,763 Daltons and PD 1.618 relative to polystyrene standard.

For the C layer coating solution, 3401.33 g of DMAC was added to a nitrogen blanketed 6-liter glass reactor fitted with a Teflon® PTFE coated stirrer and thermocouple and stirred. 500.91 g of polymer resin was added and the suspension stirred at 150 rpm and heated to 50° C. for 8 hours then gradually cooled to 25° C. and allowed to stir for 21 hours to obtain a solution with a viscosity of 150.0 poise. The solution was diluted by small additions of DMAC until a final viscosity of 71.0 Poise was obtained. The polymer solution was loaded into a Nordson EFD cartridge, pressurized with nitrogen gas and pushed through a Whatman® polypropylene filter capsule with an absolute retention of 0.45 μm prior to coating.

Films were cast as described in E5 in a normal order (layer C, followed by layer B, followed by layer A). The layer thicknesses were ~10 μm for the A and B layers and ~30 μm for the C layer. The multilayer film had a tensile modulus of 6.38 GPa and a tensile yield strain of 1.79%.

Example 17 and Comparative Example 1

For Comparative Example 1 (E1), cover windows were made using a 50 μm single layer unfilled polyimide film having the monomer composition of E3 (CBDA 0.6/6FDA 0.4//TFMB 1.0).

A hard coat liquid composition was prepared by mixing Ebecryl™ 8602 (45 parts per weight, Allnex), Photomer® 4356 (20 parts per weight, IGM Resins), Sartomer SR399 (15 parts per weight, Arkema), Ebercryl™ LED 02 (15 parts per weight, Allnex), Esacure KTO 46 (5 parts per weight, IGM Resins) in propylene glycol methyl ether acetate (166.67 parts per weight, Sigma-Aldrich). The resulting mixture was filtered through a 0.2 μm filter paper, and then OPTOOL DAC-HP (1 part per weight, Daikin Industries, Ltd.) and NANOBYK-3601 (1 part per weight, BYK USA Inc.) were added, followed by filtration (pore size 1-5 μm). The final formulation concentration range was adjusted to 20 to 60 wt % solids through further dilution with either propylene glycol methyl ether acetate (Sigma-Aldrich), methyl isobutyl ketone (Sigma-Aldrich), or 2-pentanone (Sigma-Aldrich).

The hard coat was coated on the polyimide film using a slot die coater (nRad System, nTact, Dallas, Tex.) using a shim thickness of 2 mil at a coating speed of ~30 mm/s and a coating flow rate in the range of 30-200 μL/s. Subsequently the coating, solvents were removed at 90° C., followed by curing a dried film in a Fusion F300S UV curing system (Heraeus Noblelight America LLC) equipped with a D bulb lamp (radiation energy output from 100 to 440 nm) and using a belt speed of ~50 ft/min. Multiple passes under the UV curing system were used to reach a UV dosage in the range of 2,000-4,500 mJ/cm² to get a two-layer structure having a 5 μm hard coat on the 50 μm polyimide film, HC(5 μm)/PI(50 μm).

The cover window did not exhibit any failure (evidence of polymer cracking observed under high-magnification microscopy) at 1.5 and 1.3 mm bending radii, and exhibited initial signs of strain failure at a bending radius of 1.2 mm. From these results, it was determined that the strain failure of this material is 2.203%. The modulus of this polymer film composition was 6340 MPa.

To further test the bending performance, scratch resistance and puncture resistance of the cover window, the hard coat/polymer film was further laminated to an impact film using an optically clear adhesive.

For the impact film, a urethane acrylate liquid composition was prepared by mixing 39.7 g of Ebecryl™ 230 and 39.7 g of Ebecryl™ 130 (commercially available from Allnex); 2.5 g of Omnirad™ 4265, 1.3 g of Omnirad™ 819 and 1.3 g of Omnirad™ 184 (commercially available from IGM Resin); 4.2 g of trimethylolpropane triacrylate (TMPTA); 4.2 g of Jeffamine® T403 (commercially available from Huntsman); 7.1 g of methyl isobutyl ketone (MIBK); and 0.2 g of Omnistab IC (commercially available from IGM Resin) to obtain homogeneous liquid formulation.

A 50 μm urethane acrylate film was prepared by casting the urethane acrylate liquid formulation on a PET substrate using an nRad slot die coater using a shim thickness of 4 mil at a coating speed of ~2 mm/s and a coating flow rate in the range of 30-200 μL/s. Solvents of the formulation were removed using a soft bake process at 90° C. The Fusion F300S UV curing system with D bulb was used to cure and solidify the cast film using a belt speed of ~50 ft/min. Multiple passes under the UV curing system were used to reach a UV dosage in the range of 2,000-4,500 mJ/cm² for sufficient curing. Next, the cured film was baked at 90° C. for 15 min to remove the residue solvents and un-reacted monomers. The 50 μm urethane acrylate (UA) film was peeled off from the PET substrate before use.

A 25 μm OCA film (3M™ Optically Clear Adhesives 8211) was laminated to the HC(5 μm)/PI(50 μm) bilayer film and the UA film to form a HC(5 μm)/PI(50 μm)/OCA/UA (50 μm) multilayer film for testing.

For Example 17 (E17), a cover window was made using the multilayer polymer film of E9 (15 μm A layer and 35 μm B layer), where the B layer had a modulus of 6340 MPa and the A layer (15 wt % $SiO_2$) had a modulus of 6639 MPa, or 5% higher than the B layer. The hard coat was applied as described above for CE1, and a HC(5 μm)/E9(50 μm)/OCA/UA(50 μm) multilayer film was formed as described above for CE1.

As expected, the cover window having an unfilled polyimide film (CE1) exhibited a better opening angle in the static bend test than that with the stiffer multilayer polymer film (E17), but both cover window constructions survive the dynamic bending test. For scratch resistance, E17 (6000 cycles) was significantly better than CE1 (3000 cycles), more than double the number of cycles before significant visible scratches. In addition, the water contact angle of E17 did not drop below 105° until 3000 cycles, far better than the 1000 cycles of CE1.

The performance of these cover windows is summarized in Table 14. When tested for transverse puncture at a 10 μm/s loading rate, the cover window of E17 reached a load of 15.5 N before failure, while the CE1 cover window failed sooner, at a load of 12.5 N. Similarly, when tested at 33 μm/s loading rate, the E17 cover window reached a load of 25.1 N before failure, while the CE1 cover window reached a load of 21.3 N before failure.

TABLE 14

| Example | CE1 | E17 |
|---|---|---|
| Static bend (opening angle) | 75° | 65° |
| Dynamic bend (strain failure, R = 1.5 mm) | No | No |
| Cycles to significant visible scratches | 3000 | 6000 |
| Cycles to WCA < 105° | 1000 | 6000 |
| QS transverse puncture @10 µm/s (N) | 12.5 | 15.5 |
| QS transverse puncture @33 µm/s (N) | 21.3 | 25.1 |

What is claimed is:

1. A multilayer polymer film comprising:
a first polymer layer having a first elastic modulus, wherein the first polymer layer comprises a polyimide, a polyamide imide, a block copolymer of a polyimide or a polyamide imide or a mixture thereof; and
a second polymer layer having a second elastic modulus, wherein the second polymer layer comprises a polyimide, a polyamide imide, a block copolymer of a polyimide or a polyamide imide or a mixture thereof, wherein:
the polymers of both the first and second polymer layers are cross-linked;
the first elastic modulus is different from the second elastic modulus; and
the first and second polymer layers are bonded by consolidation and cross-linking.

2. The multilayer polymer film of claim 1, wherein the first polymer layer, the second polymer layer, or both the first and second polymer layers further comprise nanoparticles.

3. The multilayer polymer film of claim 1, wherein: (i) the first polymer layer further comprises an imidization catalyst, or (ii) the second polymer layer further comprises an imidization catalyst, or (iii) both the first and second polymer layers further comprise an imidization catalyst.

4. The multilayer polymer film of claim 1, wherein a Mode I interlaminar fracture toughness (Gig) between the first and second polymer layers is at least 500 J/m$^2$.

5. The multilayer polymer film of claim 1, wherein a difference between the elastic moduli of the first and second polymer layers is at least 5%.

6. The multilayer polymer film of claim 1, further comprising a third polymer layer having a third elastic modulus, wherein the third polymer layer comprises a polyimide, a polyamide imide, a block copolymer of a polyimide or a polyamide imide or a mixture thereof, wherein the second polymer layer is positioned between the first and third polymer layers and the second and third polymer layers are bonded by consolidation.

7. The multilayer polymer film of claim 6, wherein a difference between the elastic moduli of the second and third polymer layers is at least 5%.

8. The multilayer polymer film of claim 6, wherein: (i) the second elastic modulus is smaller than the first elastic modulus and the third elastic modulus is greater than the second elastic modulus, or (ii) the second elastic modulus is greater than the first elastic modulus and the third elastic modulus is greater than the second elastic modulus, or (iii) the second elastic modulus is smaller than the first elastic modulus and third elastic modulus smaller than the second elastic modulus, or (iv) the second elastic modulus is smaller than the first elastic modulus and third elastic modulus greater than the second elastic modulus.

9. The multilayer polymer film of claim 6, wherein: (i) the first elastic modulus and the third elastic modulus are essentially the same, or (ii) the first elastic modulus is greater than the third elastic modulus, or (iii) the third elastic modulus is greater than the first elastic modulus.

10. The multilayer polymer film of claim 6, wherein the third polymer layer is cross-linked.

11. The multilayer polymer film of claim 10, wherein the second and third polymer layers are further bonded by cross-linking.

12. The multilayer polymer film of claim 6, wherein a Mode I interlaminar fracture toughness (Gig) between the second and third polymer layers is at least 500 J/m$^2$.

* * * * *